US012657681B2

(12) United States Patent
Mori

(10) Patent No.: US 12,657,681 B2
(45) Date of Patent: Jun. 16, 2026

(54) IMAGE QUALITY EVALUATION DEVICE, IMAGE FORMING DEVICE, AND IMAGE QUALITY EVALUATION METHOD

(71) Applicant: Konica Minolta, Inc., Tokyo (JP)

(72) Inventor: Hiroyuki Mori, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 494 days.

(21) Appl. No.: 17/928,957

(22) PCT Filed: Jun. 2, 2020

(86) PCT No.: PCT/JP2020/021823
§ 371 (c)(1),
(2) Date: Dec. 1, 2022

(87) PCT Pub. No.: WO2021/245805
PCT Pub. Date: Dec. 9, 2021

(65) Prior Publication Data
US 2023/0230219 A1      Jul. 20, 2023

(51) Int. Cl.
*G06T 7/00*           (2017.01)
*B41J 2/21*           (2006.01)
*B41J 29/393*         (2006.01)

(52) U.S. Cl.
CPC ........... *G06T 7/0004* (2013.01); *B41J 2/2132* (2013.01); *B41J 29/393* (2013.01); *G06T 2207/20021* (2013.01); *G06T 2207/30144* (2013.01); *G06T 2207/30168* (2013.01)

(58) Field of Classification Search
CPC . G06T 2207/30144; G06T 2207/30168; G06T 7/0002–001; B41J 2/2132; B41J 29/393; B41J 2025/008
See application file for complete search history.

(56) References Cited

FOREIGN PATENT DOCUMENTS

| JP | H0968497 A | 3/1997 |
| JP | 2006123451 A | 5/2006 |
| JP | 2007198850 A | 8/2007 |

OTHER PUBLICATIONS

David Nébouy. Printing quality assessment by image processing and color prediction models. Image Processing [eess.IV]. Université Jean Monnet—Saint-Etienne, 2015. English. NNT : 2015STET4018. tel-01624275 (Year: 2017).*
Freddi, Alessandro, et al. "Introduction to the Taguchi method." Design principles and methodologies: from conceptualization to first prototyping with examples and case studies (2019): 159-180. (Year: 2019).*

(Continued)

*Primary Examiner* — Geoffrey E Summers
(74) *Attorney, Agent, or Firm* — CANTOR COLBURN LLP

(57) ABSTRACT

This image quality evaluation device comprises: a conversion unit that converts the data of an image to two-dimensional array data of the luminance value of each pixel in the image; a processing unit that executes an averaging process, based on a plurality of filter sizes, on each pixel of the two-dimensional array data; and an evaluation unit that evaluates the quality of the image using the processing results of the processing unit.

10 Claims, 6 Drawing Sheets

(56)     References Cited

OTHER PUBLICATIONS

Grice, Jim, and Jan P. Allebach. "The print quality toolkit: An integrated print quality assessment tool." Journal of Imaging Science and Technology 43.2 (1999): 187-199. (Year: 1999).*
Jing, Xiaochen, et al. "A general approach for assessment of print quality." Image Quality and System Performance X. vol. 8653. SPIE, 2013. (Year: 2013).*
International Search Report for International Application No. PCT/JP2020/021823; Date of Mailing; Jul. 7, 2020.

* cited by examiner

IMAGE QUALITY EVALUATION DEVICE, IMAGE FORMING DEVICE, AND IMAGE QUALITY EVALUATION METHOD

CROSS REFERENCE TO RELATED APPLICATIONS

This is the U.S. national stage of application No. PCT/JP2020/021823, filed on Jun. 2, 2020. Priority is claimed under 35 U.S.C. 371, the disclosure of which is incorporated herein by reference.

TECHNICAL FIELD

The present invention relates to an image quality evaluation apparatus, an image forming apparatus, and an image quality evaluation method.

BACKGROUND ART

In an image forming apparatus and the like, an output image that is output to a recording medium may be different from an image on image data due to a variation in density such as density unevenness; thus, image quality of the output image needs to be evaluated.

As a conventional image quality evaluating method, for example, Patent Literature (hereinafter referred to as "PTL") 1 discloses a configuration for performing quality determination of the density unevenness by performing a frequency analysis (Fourier transform) for image data in each of a plurality of processing regions in an image to extract a power spectrum value in a particular frequency.

Further, PTL 2 discloses a configuration in which variation data of an image characteristic value is divided for each fixed section and image quality is thus evaluated based on the image characteristic value of each divided section.

Further, PTL 3 discloses a configuration in which a difference between the mean luminance of a center portion of luminance data of a two-dimensional image and the mean luminance of a peripheral portion is calculated for each region, and a histogram indicating the frequencies of the differences is generated, thereby evaluating luminance unevenness on an image based on a frequency total addition value obtained by adding each frequency of a difference greater than a threshold value.

CITATION LIST

Patent Literatures

PTL 1
Japanese Patent Application Laid-Open No. H09-68497
PTL 2
Japanese Patent Application Laid-Open No. 2006-123451
PTL 3
Japanese Patent Application Laid-Open No. 2007-198850

SUMMARY OF INVENTION

Technical Problem

However, there are some products that can be evaluated as non-defective in the evaluation based on human visual observation (sensitivity) even though they are evaluated as defective in the evaluation by an apparatus. Therefore, in the configurations of PTL 2 and PTL 3, correlation with the evaluation based on human visual observation becomes poor, and thus, an appropriate evaluation of image quality may not be performed.

Further, although a particular frequency is obtained by taking into account human visual characteristics (sensitivity) in PTL 1, the configuration thereof is for performing the frequency analysis; accordingly, an enormous number of operations is necessary to be performed in the apparatus, which causes a problem in that an evaluation time for the image quality is prolonged.

An object of the present invention is to provide an image evaluation apparatus, an image forming apparatus, and an image quality evaluation method each capable of easily performing evaluation of image quality while taking correlation with evaluation based on human sensitivity.

Solution to Problem

An image quality evaluation apparatus according to the present invention includes:

an acquire section that acquires image data of an image output to a recording medium;

a conversion section that converts the image data acquired by the acquire section into two-dimensional array data of a luminance value of each pixel of the image;

a processing section that performs average processing based on a plurality of filter sizes for each pixel of the two-dimensional array data; and an evaluation section that performs evaluation of image quality of the image by using a processing result by the processing section.

An image forming apparatus according to the present invention includes:

an image forming section that forms an image;

a control section that controls the image forming section based on a predetermined image forming condition; and the image quality evaluation apparatus described above.

An image quality evaluation method according to the present invention is used in an image quality evaluation apparatus, the method including:

acquiring image data of an image output to a recording medium;

converting the acquired image data into two-dimensional array data of a luminance value of each pixel of the image;

performing average processing based on a plurality of filter sizes for each pixel of the two-dimensional array data configured of each pixel of the image; and performing evaluation of image quality of the image by using a processing result of the average processing.

Advantageous Effects of Invention

According to the present invention, it is possible to easily perform evaluation of image quality while taking correlation with evaluation based on human sensitivity.

DESCRIPTION OF EMBODIMENTS

Figure 1:
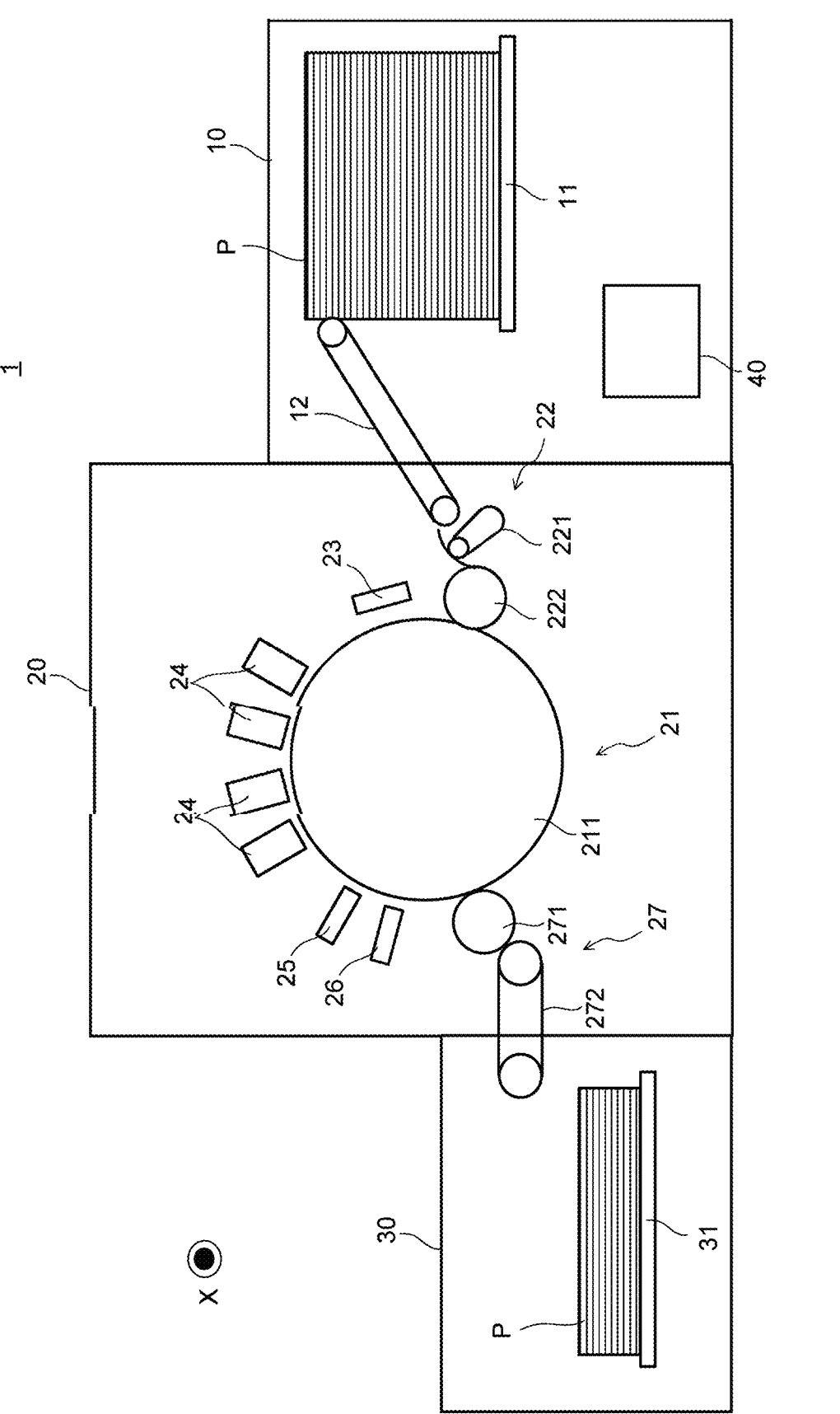
FIG. 1 illustrates an overview configuration of an image forming apparatus according to an embodiment of the present invention.

Hereinafter, an embodiment of the present invention will be described in detail with reference to the accompanying drawings. FIG. 1 illustrates an overview configuration of image forming apparatus 1 according to an embodiment of the present invention.

Image forming apparatus 1 is an inkjet image forming apparatus that records an image on recording medium P. Image forming apparatus 1 includes sheet feeding section 10, image forming section 20, sheet ejection section 30, and control section 40.

Under control by control section 40, image forming apparatus 1 conveys recording medium P stored in sheet feeding section 10 to image forming section 20, discharges ink onto recording medium P in image forming section 20 to record an image, and conveys recording medium P on which the image is recorded to sheet ejection section 30.

More specifically, image forming apparatus 1 records a color image on recording medium P by overlaying and outputting each of four colors of yellow (Y), magenta (M), cyan (C), and black (K) on recording medium P with a predetermined number of recording gradations for each of the colors.

As recording medium P, it is possible to use paper, such as normal paper and coated paper, as well as various media, such as a fabric and a sheet-like resin, that can fix the ink impacted on the surface.

Sheet feeding section 10 includes sheet feed tray 11 that stores recording medium P, and medium supply section 12 that conveys and supplies recording medium P from sheet feed tray 11 to image forming section 20. Medium supply section 12 includes a ring-shaped belt whose inner side is supported by two rollers and conveys recording medium P from sheet feed tray 11 to image forming section 20 by rotating the rollers in a state where recording medium P is placed on the belt.

Image forming section 20 includes conveyance section 21, passing unit 22, heating section 23, head units 24, irradiation section 25, reading section 26, delivery section 27, and the like.

Conveyance section 21 holds recording medium P placed on a conveyance surface of conveyance drum 211 that has a cylindrical shape, and conveyance drum 211 rotates and moves around a rotation axis (cylindrical axis) extending in an X direction perpendicular to FIG. 1 so that recording medium P on conveyance drum 211 is conveyed in a conveyance direction along the conveyance surface.

Conveyance drum 211 includes a claw section and a suction section (neither is illustrated) for holding recording medium P on the conveyance surface of conveyance drum 211. An edge of recording medium P is pressed by the claw section, and recording medium P is suctioned to the conveyance surface by the suction section so that recording medium P is held on the conveyance surface.

Passing unit 22 is provided at a position between medium supply section 12 of sheet feed section 10 and conveyance section 21, and holds and takes up one end of recording medium P, which is conveyed from medium supply section 12, with swing arm section 221, and passes recording medium P to conveyance section 21 via passing drum 222.

Heating section 23 is provided between a placement position of delivery drum 222 and an arrangement position of head units 24, and heats recording medium P such that recording medium P conveyed by conveyance section 21 has a temperature within a predetermined temperature range. Heating section 23 includes, for example, an infrared heater and applies electric power to the infrared heater based on a control signal supplied from control unit 40 to cause the infrared heater to generate heat.

Head units 24 each record the image by discharging the ink onto recording medium P from a nozzle opening section provided in an ink discharge surface facing the conveyance surface of conveyance drum 211 at an appropriate timing in accordance with the rotation of conveyance drum 211 on which recording medium P is held.

Head units 24 are arranged such that the ink discharge surface and the conveyance surface are apart from each other by a predetermined distance. In image forming apparatus 1 of the present embodiment, four head units 24 corresponding to inks of four colors of Y, M, C, and K, respectively, are arranged so as to be aligned at predetermined intervals in an order of the Y, M, C, and K colors from an upstream side of the recording medium P-conveying direction.

Head units 24 are used at fixed positions when the image is recorded, and record the image with a single pass method by successively discharging the ink at a predetermined interval (conveyance direction interval) at different positions in the conveyance direction in accordance with the conveyance of recording medium P. Incidentally, a head unit may record the image with another method such as a scanning method.

Note that, the configuration of head units 24 is not limited to the above configuration as long as a plurality of recording elements are provided at positions different from each other in the X direction.

Irradiation section 25 is placed over a width of the X direction of conveyance section 21, and irradiates recording medium P placed on conveyance section 21 with an energy ray (ultraviolet ray in wavelength of 395 nm) so as to cure and fix the ink discharged onto recording medium P. Irradiation section 25 is placed, in the conveying direction, facing the conveyance surface between a placement position of head units 24 and a placement position of passing drum 271 of delivery section 27.

Reading section 26 is provided on a downstream side in the conveyance direction relative to irradiation section 25 and reads an output image (ink) formed on recording medium P. Information on the output image that is read by reading section 26 is an RGB value (R component, G component, and B component) for each pixel, and is output to control section 40, and/or image quality evaluation section 100 and the like to be described later.

Delivery section 27 includes belt loop 272 that includes a ring-shaped belt whose inner side is supported by two rollers, and passing drum 271 that has a cylindrical shape and passes recording medium P from conveyance section 21 to belt loop 272. Delivery section 27 uses belt loop 272 to convey recording medium P passed from conveyance section 21 onto belt loop 272 by passing drum 271 so that recording medium P is sent out to sheet ejection section 30.

Sheet ejection section 30 includes sheet tray 31 which has a plate shape and on which recording medium P sent out from image forming section 20 by delivery section 27 is placed.

Figure 2:
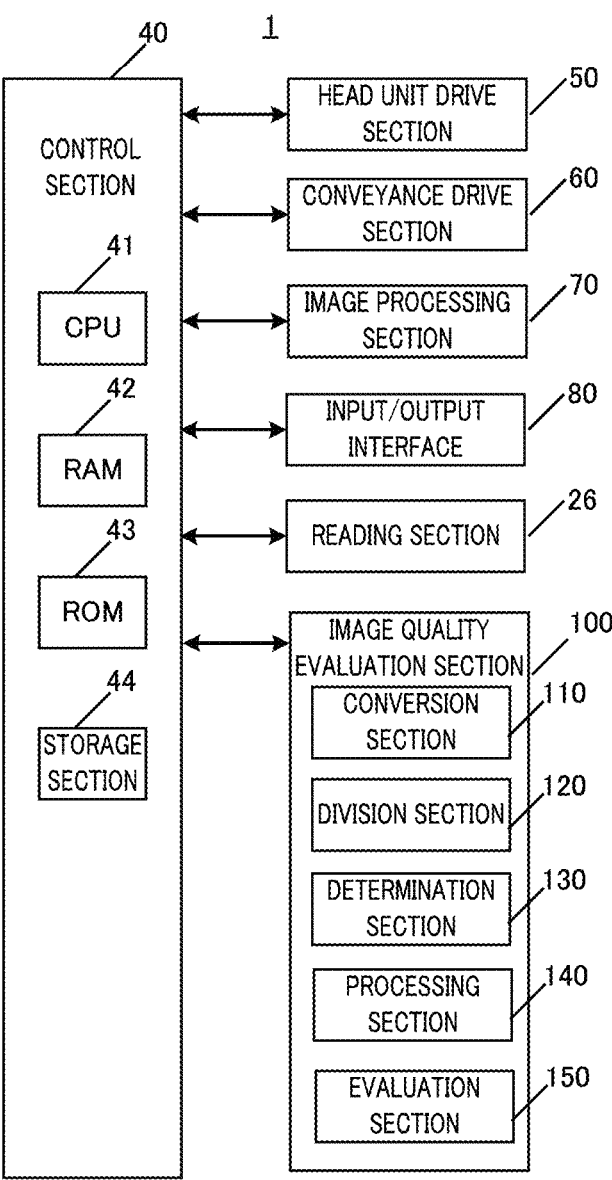
FIG. 2 is a block diagram illustrating a main functional configuration of the image forming apparatus.

FIG. 2 is a block diagram illustrating a main functional configuration of image forming apparatus 1. Image forming apparatus 1 includes control section 40, head unit drive section 50, conveyance drive section 60, image processing section 70, input/output interface 80, and image quality evaluation section 100. Image quality evaluation section 100 corresponds to the "image quality evaluation apparatus" of the present invention.

Control section 40 includes CPU 41 (Central Processing Unit), RAM 42 (Random Access Memory), ROM 43 (Read Only Memory), and storage section 44, and integrally controls overall operation of image forming apparatus 1.

CPU 41 reads out programs for various types of control and setting data stored in ROM 43 to store them in RAM 42 and executes the programs to perform various types of arithmetic processing.

RAM 42 provides CPU 41 with a memory space for work and stores temporary data. RAM 42 may include a non-volatile memory.

ROM 43 stores the programs for various types of control, the setting data, and the like to be executed by CPU 41. Note that, a rewritable non-volatile memory such as an Electrically Erasable Programmable Read Only Memory (EEPROM) and a flash memory may be used instead of ROM 43.

Storage section 44 stores a print job that is input from a non-illustrated external apparatus via input/output interface 80, image data of an image to be recorded by the print job, or the like. As storage section 44, a Hard Disk Drive (HDD) may be used, for example, and a Dynamic Random Access Memory (DRAM) or the like may be used in combination.

Head unit drive section 50 supplies a driving signal in accordance with image data to the recording element of head unit 24 based on the control by control section 40 at an appropriate timing so that the ink in an amount in accordance with a pixel value of the image data is discharged from a nozzle of head unit 24.

Conveyance drive section 60 supplies a driving signal to a conveyance drum motor provided in conveyance drum 211 based on a control signal supplied from control section 40 to rotate conveyance drum 211 at a predetermined speed and timing. Further, conveyance drive section 60 supplies a driving signal to a motor for operating medium supply section 12, passing unit 22, and delivery section 27 based on a control signal supplied from control section 40 to cause recording medium P to be supplied to conveyance section 21 and to be ejected from conveyance section 21.

Image processing section 70 performs predetermined image processing to the image data stored in storage section 44 and stores the resulting image data in storage section 44. The image processing includes, in addition to correction processing that corrects the image data by applying a non-illustrated correction table or the like to the image data, color conversion processing, tone correction processing, pseudo continuous tone processing, and the like.

Input/output interface 80 is connected to an input/output interface of the external apparatus (e.g., personal computer), and mediates transmission and reception of data between control section 40 and the external apparatus. Input/output interface 80 is configured with, for example, either various serial interfaces or various parallel interfaces, or a combination thereof.

Image quality evaluation section 100 includes a CPU, a RAM, a ROM, and the like (none of them is illustrated) and evaluates image quality of an output image formed on recording medium P. An example of the output image includes a solid image of a predetermined color. Image quality evaluation section 100 includes conversion section 110, division section 120, determination section 130, processing section 140, and evaluation section 150.

Conversion section 110 acquires the information on the output image (image data) that has been read by reading section 26 and converts the information on the output image (RGB value) into predetermined two-dimensional array data. The two-dimensional array data is data in which luminance values for respective pixels are arranged in a vertical direction and a lateral direction. In the present embodiment, the lateral direction of the two-dimensional array data corresponds to the conveyance direction of recording medium P, and the vertical direction of the two-dimensional array data corresponds to a width direction of recording medium P.

Each of luminance values is located corresponding to a pixel position of the output image. The luminance value is calculated in a value of eight bits (0 to 255) with the formula of $0.299 \times R$ component$+0.587 \times G$ component$+0.114 \times B$ component, for example.

Incidentally, the luminance value is in the range of 0 to 255 in a case of eight bits, but since the value is based on a solid image of a predetermined color, a range of variation in the respective luminance values tends to fall within a relatively narrow range. Therefore, the following processing may be performed while standardizing the luminance values in the range of variation.

Division section 120 divides the two-dimensional array data into a plurality of evaluation regions. In the lateral direction (conveyance direction of recording medium P), division section 120 divides the two-dimensional array data into four, corresponding to head units 24.

Figure 3:
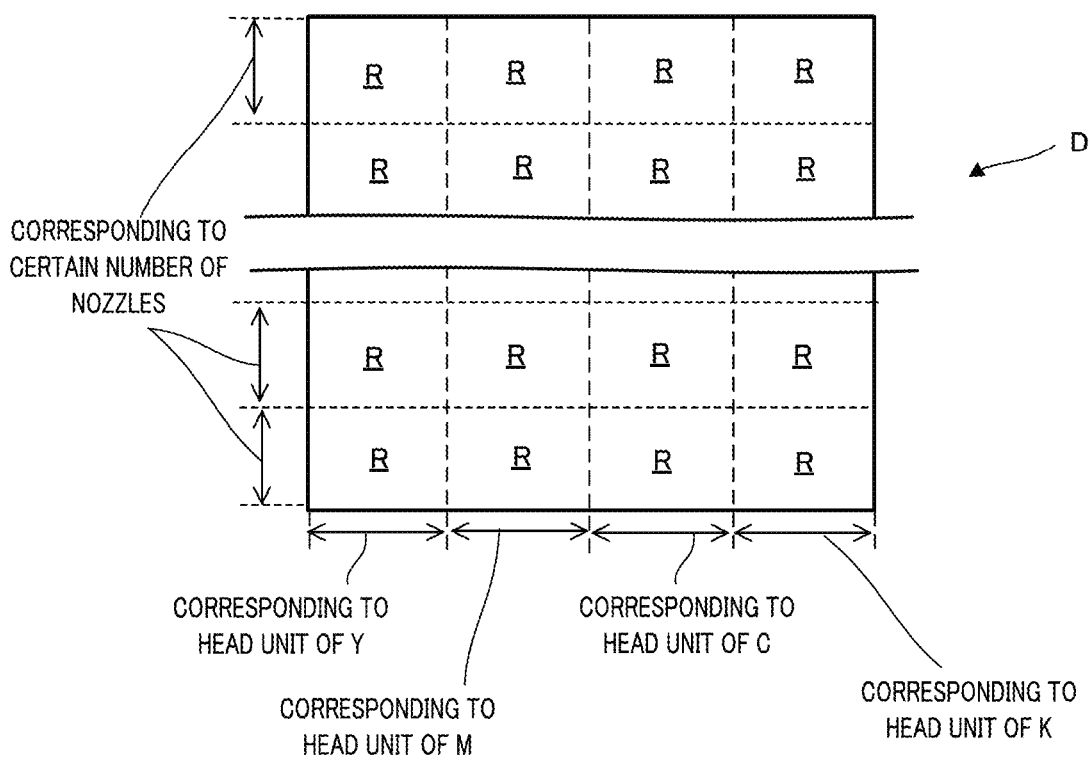
FIG. 3 illustrates two-dimensional array data that is divided into a plurality of evaluation regions.

For example, in FIG. 3, an example is indicated in which two-dimensional array data D is divided into the four regions in the lateral direction. Divided regions, in FIG. 3, correspond to head unit 24 of Y, head unit 24 of M, head unit 24 of C, and head unit 24 of K, respectively, in the order from the left. Incidentally, the luminance value is adjusted for each region according to a ratio of each of the Y, M, C, and K.

In the vertical direction, division section 120 divides two-dimensional array data D at, for example, every certain number of nozzles aligned in the width direction of recording medium P in each head unit 24. The certain number is, for example, the number of nozzles that can be driven at one time by control section 40. In this manner, two-dimensional array data D is divided into a plurality of evaluation regions R.

Determination section 130 determines a filter size constituting one side of a filter region having a square shape which is used for the average processing in each pixel of the two-dimensional array data, based on visual characteristics of a human (hereinafter may also be referred to as a human visual characteristic).

The human visual characteristic is, for example, a visual spatial frequency characteristic (VTF: Visual Transfer Function), which is a function for weighting a frequency band that is easily sensed by a human, in terms of visual characteristics of a human, as well as is a characteristic that can be calculated by the following Equation 1, for example.

[Equation 1]

$$VTF(u) = 5.05^{-\frac{0.138\pi l\mu}{180}}\left(1 - e^{-\frac{0.1\pi l\mu}{180}}\right).\qquad(1)$$

In Equation 1, u indicates a response characteristic, l indicates an observation distance of the image for a human, and $\mu$ indicates the spatial frequency.

Figure 4:
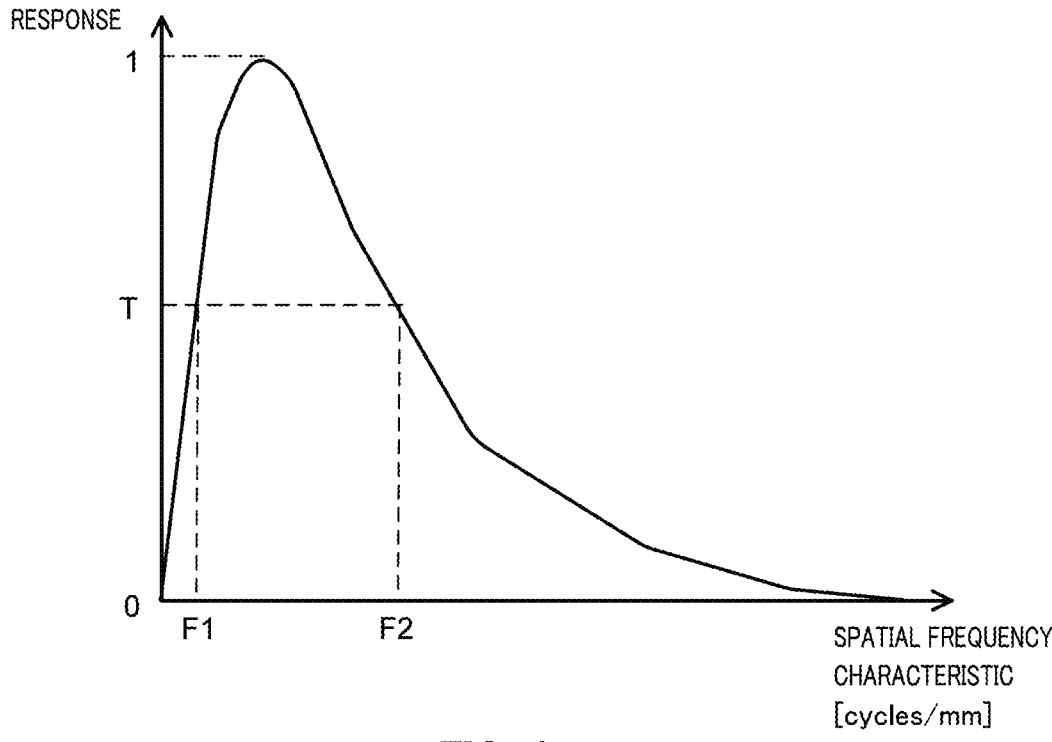
FIG. 4 illustrates an exemplary visual spatial frequency characteristic.

For example, provided that l is 300 mm, the horizontal axis is the spatial frequency, and the vertical axis as the response characteristic, as illustrated in FIG. 4, a response characteristic is obtained in which the response characteristic steeply increases as the spatial frequency approaches from 0 to around 1 whereas, after reaching the peak point, the response characteristic gradually decreases as the spatial frequency increases.

Determination section 130 extracts a spatial frequency at which a response value of the visual spatial frequency characteristic is equal to or greater than predetermined response value T (e.g., 0.5). In the case of the response characteristic illustrated in FIG. 4, two spatial frequencies of F1 (e.g., 0.24 cycles/mm) and F2 (e.g., 2.84 cycles/mm), each of which is a spatial frequency corresponding to predetermined response value T, are extracted.

Determination section 130 extracts two filter sizes based on these two spatial frequencies. Specifically, when a resolution of the image is d, determination section 130 determines integer values closest to (1/d)×(1/F1) and (1/d)×(1/F2), respectively, as the filter sizes. That is, the visual characteristic (visual spatial frequency characteristic) is determined based on the observation distance of the image for a human and the resolution of the image.

Thus, selecting a range of spatial frequency such that the response characteristic based on the human visual characteristic increases enables to extract a filter region (filter size) corresponding to the density difference that is easily recognized by a human when the human observes the image.

For example, in a case where the image resolution is 300 dpi (0.038 mm/pix (pixel)) and the spatial frequencies are 0.24 cycle/mm and 2.84 cycle/mm, the respective filter sizes are calculated as 10 pix (0.38 mm) and 100 pix (3.8 mm).

Incidentally, determination section 130 may use the two filter sizes calculated as described above as filter sizes used in processing section 140 or may determine two filter sizes used in processing section 140, within the range of the two filter sizes.

Processing section 140 performs average processing for each of a plurality of evaluation regions R based on two filter regions which are configured by the two filter sizes determined by determination section 130. Processing section 140 performs the average processing for each pixel in each of evaluation regions R.

Specifically, processing section 140 sets an interest pixel located near a center in a filter region having a square shape, as the mean value of all pixels in the filter region. Processing section 140 then shifts the filter region so that an interest pixel in a shifted position is the mean value of all pixels in the filter region of this position. Processing section 140 repeats this processing for all the pixels.

Figure 5:
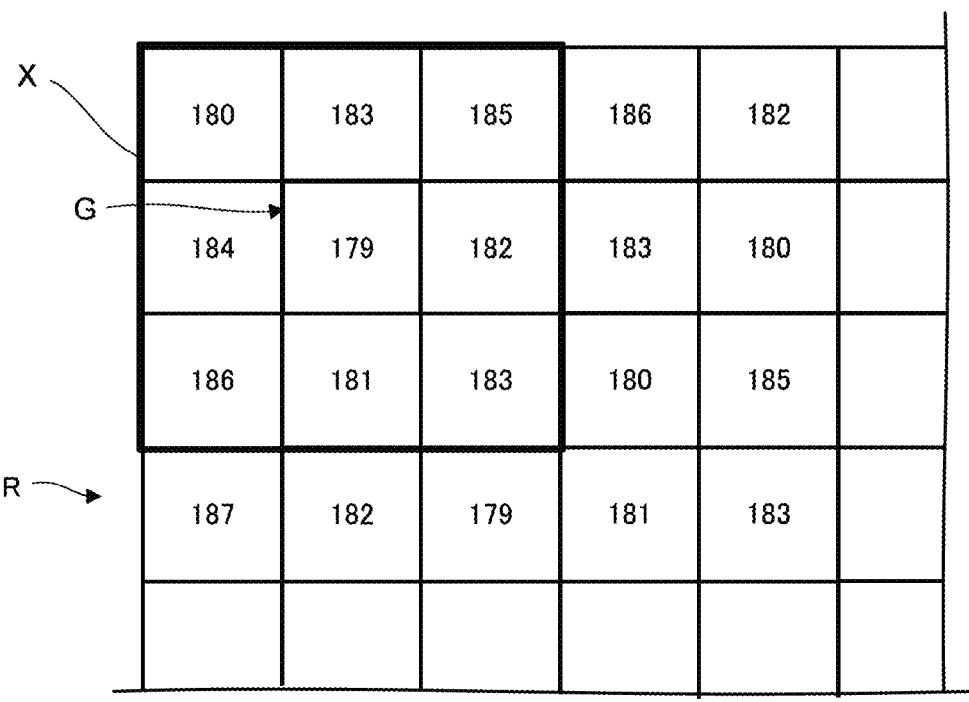
FIG. 5 is a diagram for describing average processing.

For example, as illustrated in FIG. 5, in a case where a filter size of filter region X is 3 pix, nine pixels in filter region X are 180, 183, 185, 184, 179, 182, 186, 181, and 183, so that interest pixel G (179 in FIG. 5) is 182, which is the mean value thereof. Such average processing is performed for each pixel.

Figure 6:
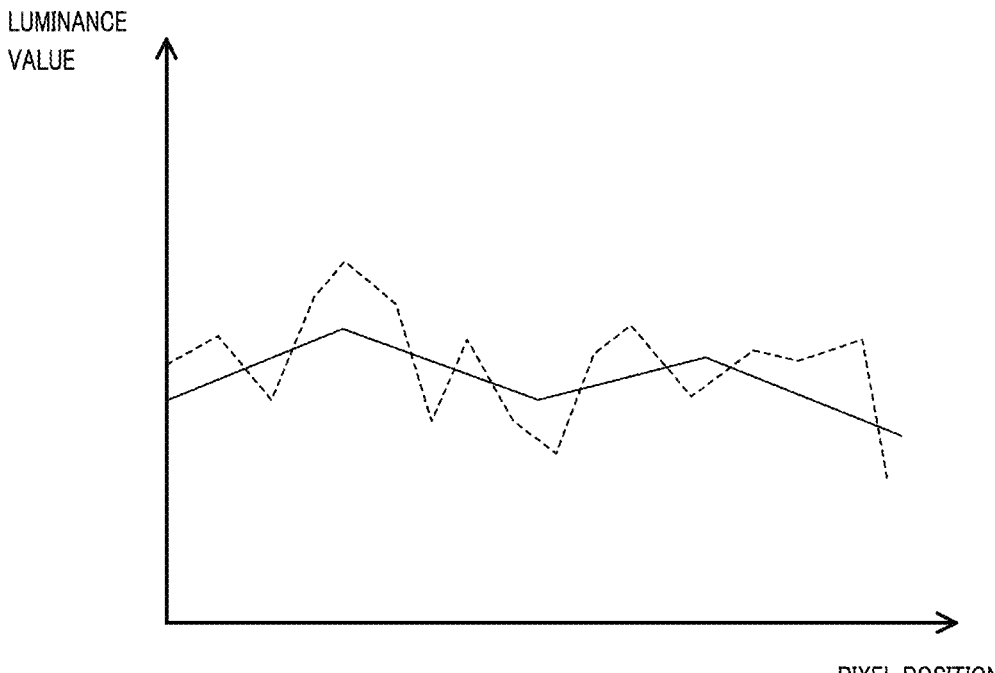
FIG. 6 illustrates examples of mean values of two types based on two filter sizes.

Processing section 140 performs the average processing described above in the two filter regions based on the two filter sizes determined by determination section 130. This results in that the mean values of two types are calculated for each pixel in each of evaluation regions R (e.g., solid line and dotted line illustrated in FIG. 6).

Evaluation section 150 performs evaluation of the output image by using a processing result by processing section 140. Specifically, evaluation section 150 calculates a difference between the mean values of two types for each pixel in each of evaluation regions R and calculates, based on the difference, a Signal-to-Noise (SN) ratio of a nominal-is-best characteristic for each of evaluation region R. The SN ratio can be calculated by following Equation 2, for example.

[Equation 2]

$$SNratio = 10\log\frac{1}{MSD}\qquad(2)$$

MSD in Equation 2 indicates the mean value of the square of a difference value of mean values of two types in each pixel and can be calculated by Equation 3. The MSD corresponds to "parameter based on a difference of mean values" of the present invention.

[Equation 3]

$$MSD = \frac{1}{n}\left(y_1^2 + y_2^2 + \dots + y_n^2\right)\qquad(3)$$

In Equation 3, n indicates a natural number indicating the number of pixels in each of evaluation region R. In Equation 3, y indicates a difference value between mean values of two types in a pixel. Each number attached to y indicates any pixel position of an evaluation region, and y of different number indicates that the pixel position is different.

Evaluation section 150 calculates an SN ratio for each of evaluation regions R as described above. Evaluation section 150 calculates an MSD (post-deletion MSD) after deleting pixels of one row at both ends in a lateral direction of each of evaluation regions R. Then, in evaluation region R where a change amount of the post-deletion MSD with respect to an MSD prior to deleting the pixels of one row described above (pre-deletion MSD) is equal to or less than a predetermined value (e.g., 10%), evaluation section determines 150 determines the pre-deletion MSD (value based on SN ratio) as an evaluation value of this evaluation region R.

In evaluation region R where the change amount of the post-deletion MSD with respect to the pre-deletion MSD is greater than the predetermined value, each process in determination section 130, processing section 140, and evaluation section 150 is performed again after deleting the pixels of one row at both ends in the lateral direction in this evaluation region R. This series of processing is performed until the change amount of the post-deletion MSD with respect to the pre-deletion MSD is equal to or less than the predetermined value, and evaluation section 150 determines a pre-deletion MSD when the change amount is equal to or less than the predetermined value as an evaluation value of the subject evaluation region.

Evaluation section 150 evaluates the image quality of the output image based on an evaluation value that is the largest value among evaluation values determined for each of evaluation regions as described above. Specifically, evaluation section 150 determines the image quality of the output image is good when the evaluation value that is the largest value is less than a predetermined evaluation value whereas evaluation section 150 determines the image quality of the output image is not good when the evaluation value that is the largest value is equal to or greater than the predetermined evaluation value. The predetermined evaluation value is a value serving as an index for evaluating the image quality of the output image as well as a value that can be set appropriately.

In the manner described above, the evaluation of the image quality is performed using each mean value to which the average processing is applied in the filter regions with the filter sizes based on the human visual characteristics, which makes it possible to easily take correlation between the evaluation by an apparatus and the evaluation based on human sensitivity.

Further, since the evaluation of the image quality is performed by comparing the mean values to which the average processing is applied in two types of filter regions having different filter sizes, it is unnecessary to perform complicated processing as in, for example, the configuration of performing a frequency analysis such as Fourier transform. As a result, the evaluation of the image quality can be performed easily.

Meanwhile, control section 40 changes an image forming condition according to an evaluation result by evaluation section 150. Specifically, when the image quality of the output image is determined by evaluation section 150 to be not good, control section 40 changes a drive voltage of head unit drive section 50 from a drive voltage that is previously set in image forming apparatus 1.

The drive voltage of head unit drive section 50 is previously set for each density of an image, for example. For example, control section 40 controls a drive voltage of head unit 24 corresponding to evaluation region R in which the evaluation value is equal to or greater than a predetermined evaluation value such that a density mean value becomes closest to a density serving as a reference during image forming and density differences in the same head unit 24 as well as with other head units 24 become smallest.

In the manner described above, feeding back the evaluation result by evaluation section 150 to control section 40 makes it possible to perform image forming of a printing job, with the good image quality, after the evaluation of the output image.

Figure 7:
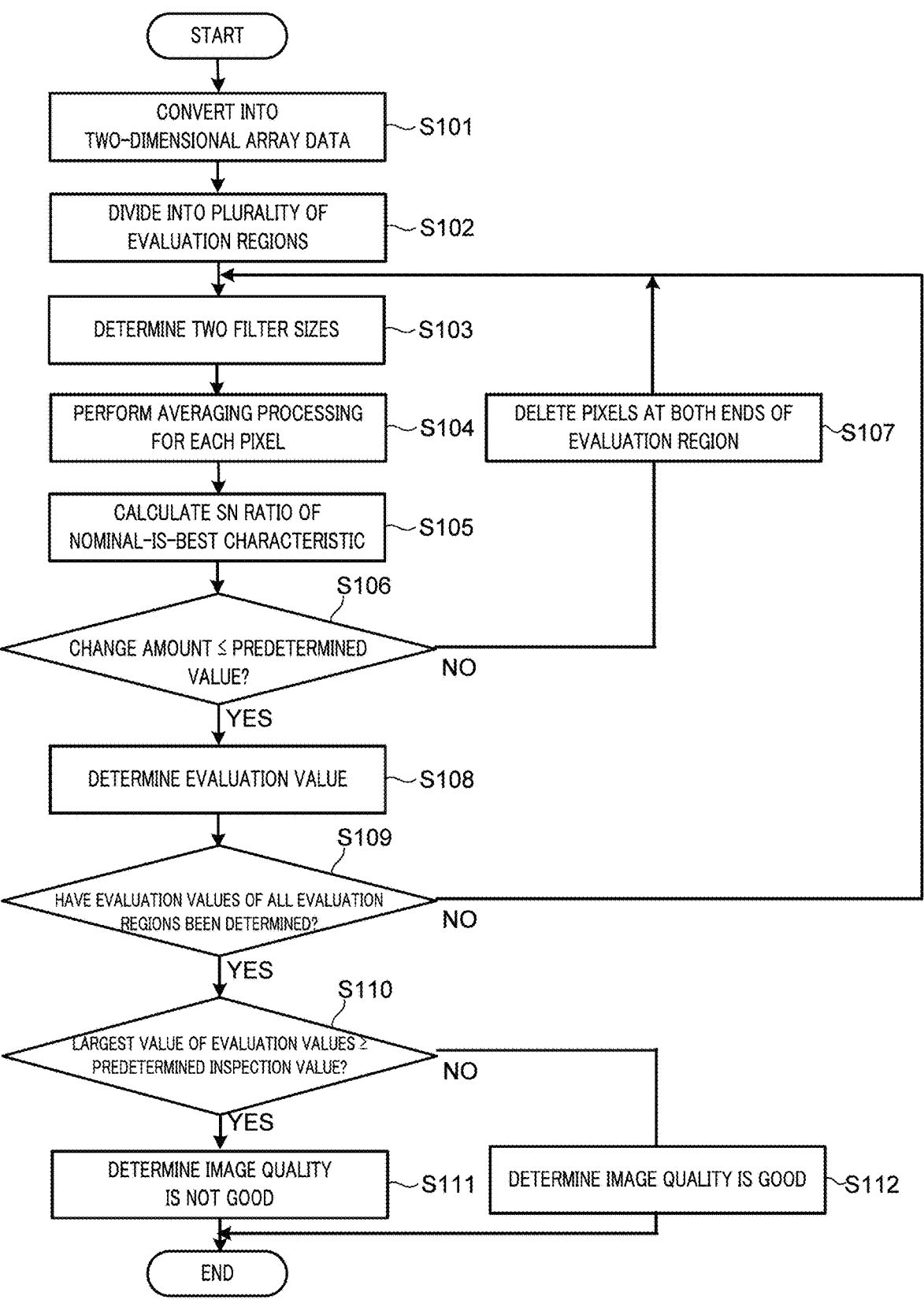
FIG. 7 is a flowchart illustrating an operation example of executing image quality evaluation control in an image quality evaluation section.

Next, a description will be given of an operation example of executing image quality evaluation control in image quality evaluation section 100. FIG. 7 is a flowchart illustrating an operation example of executing image quality evaluation control in image quality evaluation section 100. The processes in FIG. 7 are appropriately performed when image forming apparatus 1 receives a job for evaluating image quality.

As illustrated in FIG. 7, image quality evaluation section 100 acquires information on the output image and converts it into two-dimensional array data (step S101). Image quality evaluation section 100 divides the converted two-dimensional array data into a plurality of evaluation regions R (in S102 of steps).

Image quality evaluation section 100 determines two filter sizes in each of evaluation regions R (step S103). Image quality evaluation section 100 performs average processing for each pixel in each of evaluation regions R by using two filter regions based on the two filter sizes (step S104). Then, image quality evaluation section 100 calculates an SN ratio of a nominal-is-best characteristic by using mean values of two types for each pixel (step S105).

Next, image quality evaluation section 100 determines whether a change amount of a post-deletion MSD with respect to a pre-deletion MSD is equal to or less than a predetermined value (step S106). As a result of the determination, in a case where the change amount is greater than the predetermined value (step S106, NO), image quality evaluation section 100 deletes pixels of one row at both ends in a lateral direction of this evaluation region R (step S107). The processing then returns to step S103.

On the other hand, in a case where the change amount is equal to or less than the predetermined value (step S106, YES), image quality evaluation section 100 determines an evaluation value of this evaluation region R (step S108).

Next, image quality evaluation section 100 determines whether evaluation values of all evaluation regions R have been determined (step S109). As a result of the determination, in a case where the evaluation values of all evaluation regions R have not been determined (step S109, NO), the processing returns to step S103.

On the other hand, in a case where the evaluation values of all evaluation regions R have been determined (step S109, YES), image quality evaluation section 100 determines whether a largest value of the evaluation values is equal to or greater than a predetermined evaluation value (step S110).

As a result of the determination, in a case where the largest value of the evaluation values is equal to or greater than the predetermined evaluation value (step S110, YES), image quality evaluation section 100 determines that an image quality of an output image is not good (step S111). On the other hand, in a case where the largest value of the evaluation values is less than the predetermined evaluation value (step S110, NO), image quality evaluation section 100 determines that the image quality of the output image is good (step S112). After step S111 or step S112, this control ends.

According to the present embodiment configured as described above, the average processing is performed in a plurality of filter regions by a plurality of filter sizes. Incidentally, the output image undergoes, in an image forming process, a minute density variation that cannot be recognized by a human and that is due to effects of a recording medium and reading section 26. The evaluation by an apparatus takes into account of the density variation and thus may deteriorate correlation with the evaluation based on human sensitivity.

On the other hand, in the present embodiment, since an evaluation value is determined using a plurality of types of mean values to which the average processing is applied in a plurality of filter regions, evaluation of the image quality can be performed while excluding the above-described minute density variation. As a result, correlation between the evaluation by an apparatus and the evaluation based on human sensitivity can be easily taken.

In addition, the evaluation of the image quality is performed using each mean value to which the average processing is applied in the filter regions with the filter sizes determined based on the human visual characteristics, which makes it possible to easily take correlation between the evaluation by an apparatus and the evaluation based on human sensitivity.

Further, since the evaluation of the image quality is performed by comparing the values to which the average processing is applied in two types of filter regions having different filter sizes, it is unnecessary to perform complicated processing as in, for example, the configuration of performing a frequency analysis such as Fourier transform. As a result, the evaluation of the image quality can be performed easily.

That is, in the present embodiment, it is possible to easily perform the evaluation of the image quality while taking the correlation with the evaluation based on human sensitivity.

Further, since the SN ratio of the nominal-is-best characteristic is calculated using the mean value of each pixel in each of evaluation regions R, the evaluation of the image quality can be quantitatively performed.

Further, the observation distance for a human is used as a parameter in the visual spatial frequency characteristic, which is a function for weighting a frequency band that is easily sensed by a human, in terms of visual characteristics of a human. Consequently, the filter size is determined based on the observation distance for the human, which makes it possible to easily extract a spatial frequency component that is sensitive in the human visual characteristics.

Further, in a case where the change amount of the post-deletion MSD with respect to the pre-deletion MSD is greater than a predetermined value, pixels at both ends in a directional component of a direction of the two-dimensional array in an evaluation region are removed, and the average processing is repeatedly performed. Here, the pixels at both ends are likely to include a noise component, and thus, removing the pixels at both ends makes it possible to calculate an evaluation value having high robustness.

Further, feeding back the evaluation result by evaluation section 150 to control section 40 makes it possible to perform the image forming of the printing job, with the good image quality, after the evaluation of the output image.

In the above-described Embodiment, the average processing is performed using two filter regions with the two filter sizes, but the present invention is not limited to this, and the average processing may be performed using three or more filter regions with three or more filter sizes.

In addition, in the above-described Embodiment, the SN ratio of the nominal-is-best characteristic is used as an evaluation value, but the present invention is not limited to this, and anything other than the SN ratio of the nominal-is-best characteristic may be used as an evaluation value.

Further, in the above-described Embodiment, in a case where the change amount of the post-deletion MSD with respect to the pre-deletion MSD is greater than a predetermined value, the SN ratio is recalculated based on the data obtained by deleting the pixels at both ends in the lateral direction (predetermined direction) of the two-dimensional array data without the pre-deletion MSD being set as an evaluation value, but the present invention is not limited to this. For example, a pre-deletion MSD of a case where the change amount of the post-deletion MSD with respect to the pre-deletion MSD is greater than the predetermined value may be determined as the evaluation value.

Further, in the above-described Embodiment, the MSD is given as an example of a parameter based on a difference of mean values, but the present invention is not limited to this, and a parameter other than the MSD may be used as a parameter based on the difference of the mean values.

Further, in the above-described Embodiment, the filter size is determined by determination section 130, but the present invention is not limited to this and may have a configuration in which the filter size is acquired.

Further, in the above-described Embodiment, the two-dimensional array data is divided into a plurality of evaluation regions, the present invention is not limited to this, and the division into the plurality of evaluation regions may not be performed.

Further, in the above-described Embodiment, the conversion section is provided, but the present invention is not limited to this and may have a configuration in which the two-dimensional array data is acquired.

Further, in the above-described Embodiment, image quality evaluation section 100 (image evaluation apparatus) is included in image forming apparatus 1, the present invention is not limited to this, and an image evaluation apparatus provided separately from the image forming apparatus may be applicable, for example.

Further, in the above-described Embodiment, conversion section 110, division section 120, determination section 130, processing section 140, and evaluation section 150 are included in image quality evaluation section 100, but the present invention is not limited to this. For example, the present invention may have a configuration in which a conversion section, a division section, a determination section, a processing section, and evaluation section are provided separately from each other.

Further, in the above-described Embodiment, reading section 26 is provided on image forming apparatus 1, but the present invention is not limited to this, and may it be provided outside image forming apparatus 1.

Further, in the above-described Embodiment, image forming apparatus 1 of ink jet type is given as example, but the present invention is not limited to this, and a non-inkjet image forming apparatus may be applicable.

The embodiments described above are merely examples of specific implementation of the present invention, and the technical scope of the present invention should not be restrictively interpreted by these embodiments. That is, the present invention may be implemented in various forms without departing from the spirit thereof or the major features thereof. In one example, the shape, size, number, and material of each section described in the above-described embodiment are merely examples and can be implemented with an appropriate change.

Next, an experimentation result of the image quality evaluation control in the present embodiment will be described. In the following experimentation, the image quality evaluation control in the present embodiment was executed on an output image which is a solid image of a predetermined color, and visual evaluation by a plurality of humans was performed for each evaluation region of the output image; thereby correlation between the two was taken.

Figure 8:
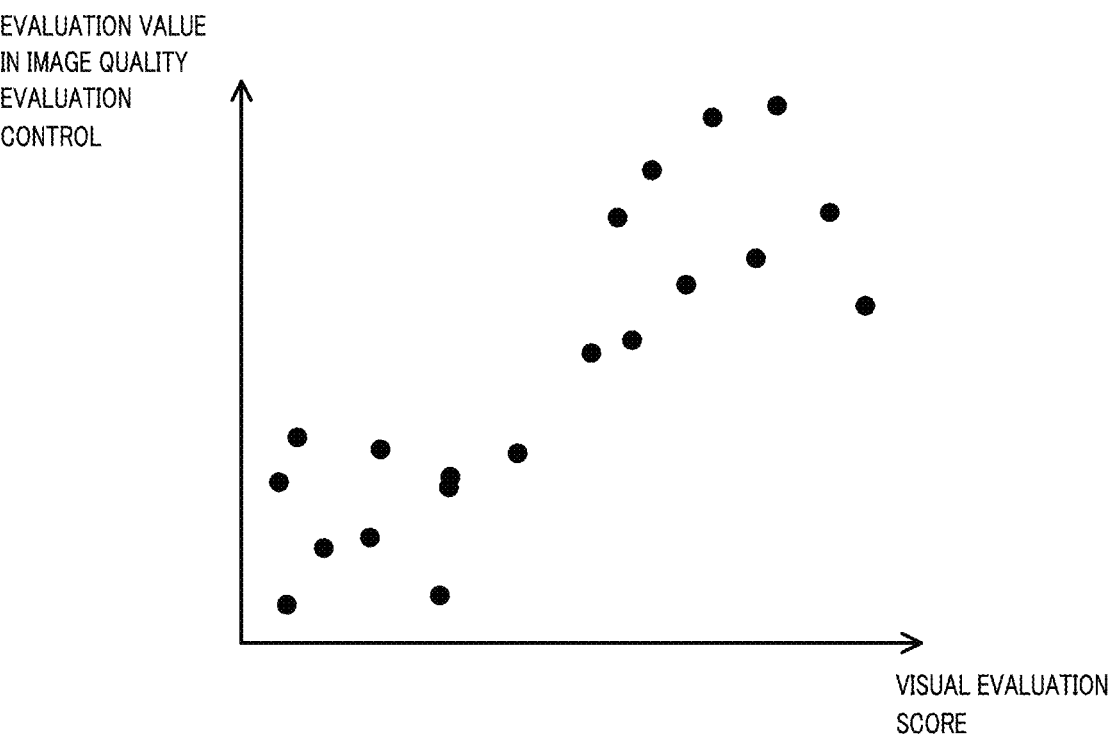
FIG. 8 illustrates an experimentation result of the image quality evaluation control in the present embodiment.

FIG. 8 is an experimentation result of the image quality evaluation control in the present embodiment. The vertical axis in FIG. 8 represents an evaluation value in the image quality evaluation control and indicates that, as the axis extends upward, the evaluation value becomes greater, i.e., the image quality is not good. The horizontal axis in FIG. 8 represents the mean value of evaluation scores of the visual evaluation and indicates that, as the axis extends rightward, the evaluation score becomes higher, i.e., the image quality is not good. In addition, a plurality of plots in FIG. 8 represents a plurality of evaluation regions R.

Incidentally, for the evaluation score, a score is given such that the better the image quality is, the lower the score is within a predetermined point range for each human who has performed the visual evaluation.

With reference to FIG. 8, evaluation region R where a relatively high evaluation value is obtained in the image quality evaluation control also has a relatively high evaluation score in the visual evaluation, whereas evaluation region R where a relatively low evaluation value is obtained in the image quality evaluation control also has a relatively low evaluation score in the visual evaluation.

That is, it was confirmed that correlation between the evaluation result and the evaluation result based on human sensitivity can be taken in image quality evaluation section 100 in the present embodiment.

REFERENCE SIGNS LIST

1 Image forming apparatus
10 Sheet feeding section
11 Sheet feed tray
12 Medium supply section
20 Image forming section
21 Conveyance section
22 Delivery unit
23 Heating section
24 Head unit
25 Irradiation section
26 Reading section
27 Delivery section
30 Sheet ejection section
31 Sheet eject tray
40 Control section
44 Storage section
50 Head unit driving section
60 Conveyance driving section
70 Image processing section
80 Input/output interface
100 Image quality evaluation section
110 Converting section
120 Dividing section
130 Determination section
140 Processing section
150 Evaluation section

The invention claimed is:

1. An image forming apparatus, comprising:
an image forming section that forms an image on a recording medium;
a first hardware processor that controls the image forming section based on a predetermined image forming condition; and
an image quality evaluation apparatus, including:
a second hardware processor that acquires image data of the image, wherein
the second hardware processor
converts the image data into two-dimensional array data of a luminance value of each pixel of the image,
performs average processing based on a plurality of filter sizes for each pixel of the two-dimensional array data, and
performs evaluation of image quality of the image by using a result of the average processing.

2. The image forming apparatus according to claim 1, wherein the plurality of filter sizes is determined based on a visual characteristic of a human.

3. The image forming apparatus according to claim 2, wherein the visual characteristic is a visual spatial frequency characteristic that is determined based on an observation distance of the image for the human and a resolution of the image.

4. The image forming apparatus according to claim 3, wherein the second hardware processor determines the plurality of filter sizes based on a plurality of frequencies at which a response value of the visual spatial frequency characteristic is equal to or greater than a predetermined response value.

5. The image forming apparatus according to claim 1, wherein the second hardware processor calculates a signal-to-noise (SN) ratio of a nominal-is-best characteristic based on a difference between mean values of two types for each pixel of the two-dimensional array data, sets a value based on the SN ratio as an evaluation value, and determines whether the image quality of the image is good based on the evaluation value.

6. The image forming apparatus according to claim 5, wherein, in a case where a change amount of a parameter based on the difference of the mean values is greater than a predetermined value, the second hardware processor recalculates the SN ratio based on data obtained by deleting pixels at both ends in a predetermined direction of the two-dimensional array data without setting a value based on the SN ratio as the evaluation value, based on the parameter.

7. The image forming apparatus according to claim 1, wherein the second hardware processor
divides the two-dimensional array data into a plurality of evaluation regions,
performs the average processing for each of the plurality of evaluation regions, based on each of the plurality of filter sizes determined for each of the plurality of evaluation regions, and
performs the evaluation of the image quality of the image, based on each processing result.

8. The image forming apparatus according to claim 1, wherein the second hardware processor changes the image forming condition according to an evaluation result by the image quality evaluation apparatus.

9. The image forming apparatus according to claim 1, wherein:
the image forming section includes a head unit that forms the image by discharging ink onto the recording medium, and
the first hardware processor changes a drive voltage of the head unit from the image forming condition, in a case where the image quality of the image is determined by the image quality evaluation apparatus to be not good.

10. An image quality evaluation method used in an image forming apparatus, the method comprising:
forming an image on a recording medium via an image forming section of the image forming apparatus;
controlling the image forming section based on a predetermined image forming condition via a first hardware processor;
acquiring image data of the image;
via a second hardware processor:
converting the acquired image data into two-dimensional array data of a luminance value of each pixel of the image;
performing average processing based on a plurality of filter sizes for each pixel of the two-dimensional array data configured of each pixel of the image; and
performing evaluation of image quality of the image by using a processing result of the average processing.

* * * * *